Oct. 12, 1943.　　　　W. O. SCHULTZ　　　　2,331,846
FUSE DEVICE
Filed March 6, 1942　　　　9 Sheets-Sheet 1

Fig.1

INVENTOR.
WILLIAM O. SCHULTZ
BY
Arthur R. Woolfolk
ATTORNEY.

Oct. 12, 1943.    W. O. SCHULTZ    2,331,846
FUSE DEVICE
Filed March 6, 1942    9 Sheets-Sheet 2

Fig. 2

INVENTOR.
WILLIAM O. SCHULTZ
BY
Arthur R. Woolock
ATTORNEY.

Oct. 12, 1943.  W. O. SCHULTZ  2,331,846
FUSE DEVICE
Filed March 6, 1942  9 Sheets-Sheet 5

INVENTOR.
WILLIAM O. SCHULTZ
BY
ATTORNEY.

Oct. 12, 1943.   W. O. SCHULTZ   2,331,846
FUSE DEVICE
Filed March 6, 1942   9 Sheets-Sheet 6

INVENTOR.
WILLIAM O. SCHULTZ
BY
ATTORNEY.

Oct. 12, 1943.     W. O. SCHULTZ     2,331,846

FUSE DEVICE

Filed March 6, 1942     9 Sheets-Sheet 7

INVENTOR.
WILLIAM O. SCHULTZ
BY
ATTORNEY.

Oct. 12, 1943. W. O. SCHULTZ 2,331,846
FUSE DEVICE
Filed March 6, 1942 9 Sheets-Sheet 8

INVENTOR.
WILLIAM O. SCHULTZ
BY
ATTORNEY.

Oct. 12, 1943.  W. O. SCHULTZ  2,331,846
FUSE DEVICE
Filed March 6, 1942  9 Sheets-Sheet 9

INVENTOR.
WILLIAM O. SCHULTZ
BY
Arthur R. Woolfolk
ATTORNEY.

Patented Oct. 12, 1943

2,331,846

UNITED STATES PATENT OFFICE 2,331,846

FUSE DEVICE

William O. Schultz, South Milwaukee, Wis., assignor to Line Material Company, South Milwaukee, Wis., a corporation of Delaware Application March 6, 1942, Serial No. 433,535

18 Claims. (Cl. 200—114)

This invention relates to a fuse device.

Objects of this invention are to provide a fuse device which employs a fuse tube open at both ends and which has a headed fuse link so arranged that the head of the fuse link closes one end of the fuse tube, and in which the head of the fuse link is adapted to be blown directly away from the end of the fuse tube in the event of a violent evolution of gas upon rupture of the fuse link so that the fuse tube will be vented at both ends.

Further objects are to provide an expulsion fuse device in which a fuse tube is provided which is open at both ends and in which a fuse link is positioned within the fuse tube and is provided with a head normally closing one end of the fuse tube, and in which stationary contacts are electrically connected under normal conditions by means of the fuse link, and in which provision is made for the free travel of the head of the fuse link away from the end of the fuse tube without engaging the adjacent stationary contact so that even under violent overload conditions no damage will be caused the stationary contact by the violent projection of the head of the fuse link outwardly away from the end of the fuse tube, and to provide a construction having the characteristics enumerated above in which the head of the fuse link has good and positive electrical contact with the adjacent electrically conducting portion of the fuse device.

A further specific object of this invention is to provide an expulsion fuse device in which the fuse tube is open at both ends, one end being closed by the head of the fuse link and the head of the fuse link being gripped in such a manner that under light overloads the head of the fuse link will not be blown off and the action of the fuse tube will be that of a fuse tube open at one end only to thereby assist in the speedy clearing of the circuit inside the fuse tube, the construction being such that under heavy overloads the head of the fuse link is blown from the fuse tube to thereby provide venting of the fuse tube at both ends, the device therefore having both the characteristics of an expulsion fuse tube open at one end only for light overloads and vented at both ends for heavy overloads.

Further objects are to provide a fuse device in which a fuse tube is employed in cooperation with a headed fuse link and with stationary contacts which are normally electrically connected through the fuse link and to have at least one of the stationary contacts resiliently urged towards contacting position and to utilize the spring force of the resiliently urged stationary contact to hold the parts which grip the head of the fuse link in operative position and in certain forms of the invention to translate the force of the resiliently urged stationary contact into the gripping force which grips the head of the fuse link.

Further objects are to provide a fuse construction which includes an open ended fuse tube and a headed fuse link, and to provide gripping means for gripping the head of the fuse link in such a manner that the head of the fuse link can be blown directly away from the gripping means without damage to the gripping means or to any other part of the device, and to provide for dropping the fuse tube outwardly from operative to inoperative position upon rupture of the fuse link.

Embodiments of the invention are shown in the accompanying drawings, in which.

In the first form of the invention illustrated in Figures 1 through 8, a drop-out expulsion fuse device has been illustrated. It comprises an insulating supporting means which may taken the form of the elongated insulator 1 which is held intermediate its ends by means of the clamping strap 2 clamped in position around the insulator by means of the bolt and nut arrangement indicated at 3. This strap 2 is supported in any suitable manner from a stationary support, such as the cross-arm indicated at 4.

The fuse device includes the fuse tube 5 which is open at both ends. The upper end of the fuse tube is provided with a metallic head portion 6 which has an aperture therethrough, as may be seen from reference to Figure 2. It is secured to the fuse tube 5 in any suitable manner as by means of the transverse pin 7 and is provided with a manipulating eyelet portion 8 and with a stop and guiding finger 9 which is adapted to enter between the resilient arms 10 of the upper stationary contact. The upper stationary contact may be provided with a projecting portion 11 which receives the connector 12 for the line wire.

Figures 4, 5, 6:
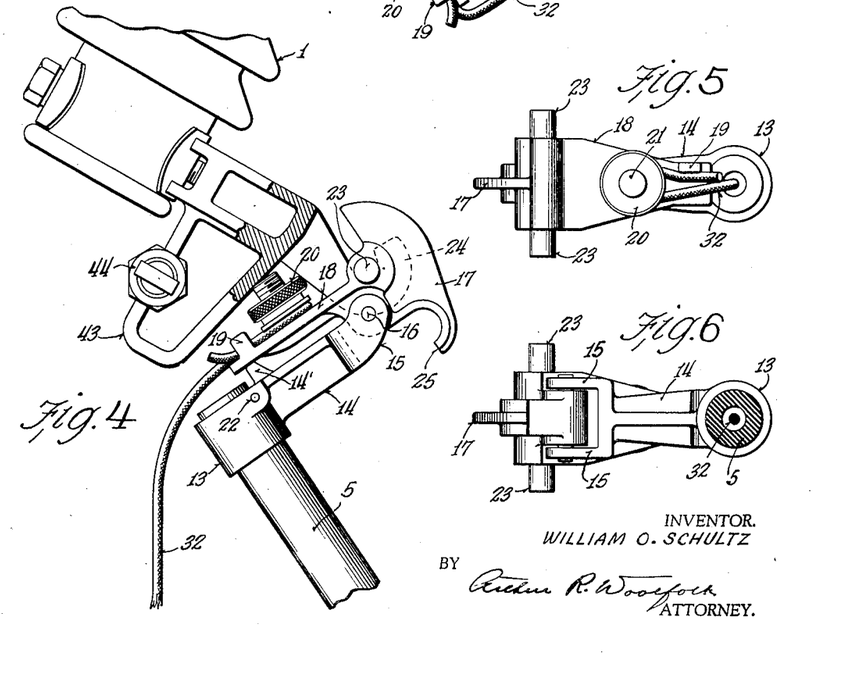
Figure 4 is a view corresponding to Figure 3 showing the parts in their final position after rupture of the fuse link.
Figure 5 is a bottom view of the structure shown in Figure 2.
Figure 6 is a sectional view on the line 6—6 of Figure 2.

The lower end of the fuse tube is rigidly mounted within the sleeve portion 13 of an outwardly projecting arm 14 rigid with the fuse tube and provided with downwardly curved, bifurcated portions 15 which are pivotally joined by means of the pin 16 to the rear portion 17 of a combined lever and fuse extracting member 18. The combined lever and fuse extracting member 18 is provided with a lip 19 against which the free end of the leader of the fuse link is adapted to bear, as shown in Figure 5, the leader of the fuse link being clamped by means of the thumb nut 20 which is carried by the threaded stem 21, which latter is rigid with the lever 18. The arm 14 is provided with a stop 14' to limit the inward motion of the lever 18 when the device is refused.

The arm 14 may be rigidly secured to the fuse tube 5 in any suitable manner, for instance by means of the locking pin 22.

The lever 18 is provided with outwardly projecting trunnions 23 which are removably received within the hooks 24 of the lower stationary contact. It is to be noted that the portion 17 of the lever 18 is provided with a rounded or extended portion which prevents inadvertent detachment of the trunnions 23 from the overhanging portions of the hooks 24 until the fuse tube is rocked to its lowermost position, as indicated in Figure 4. Also the portion 17 is provided with a hook like member 25 which is adapted to receive a switch stick for repositioning of the refused device in the lower hook members 24, the fuse device being thereafter rocked into operative position by engaging the switch stick with the eyelet portion 8 at the normally upper end of the fuse tube.

Figure 1:
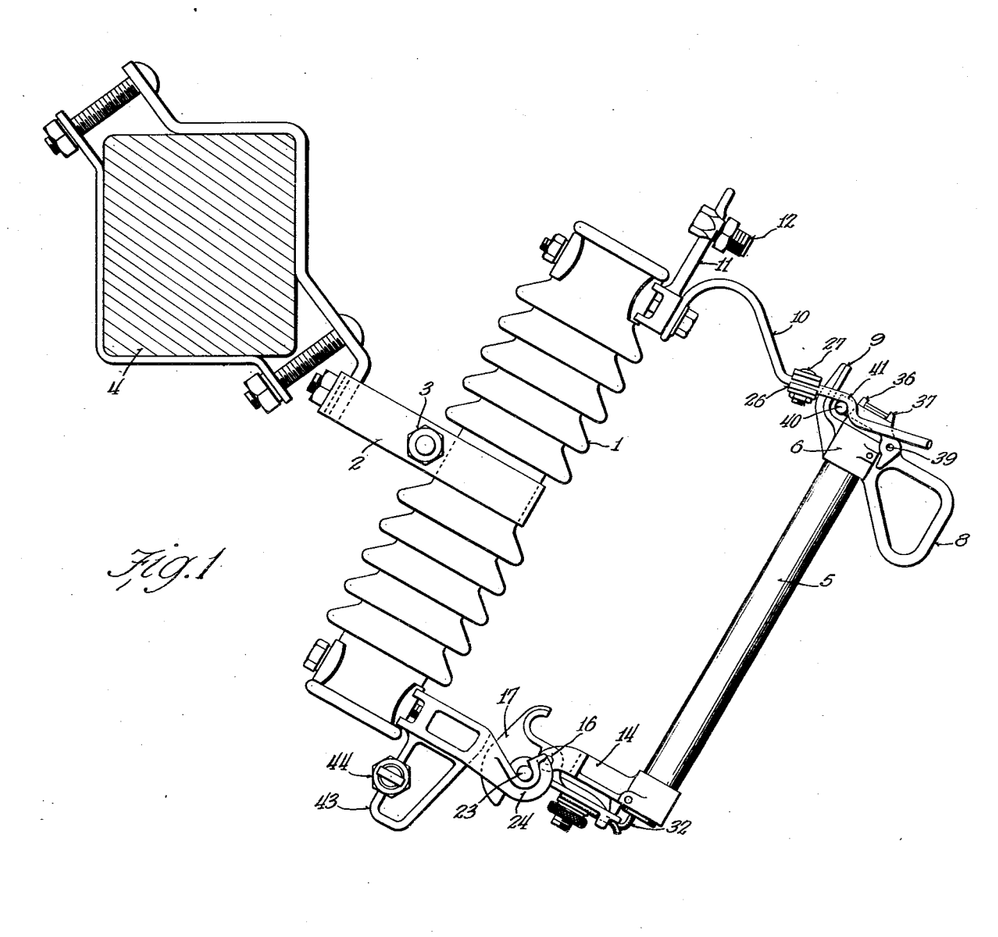
Figure 1 is a view of one form of the fuse device.
Figure 2:
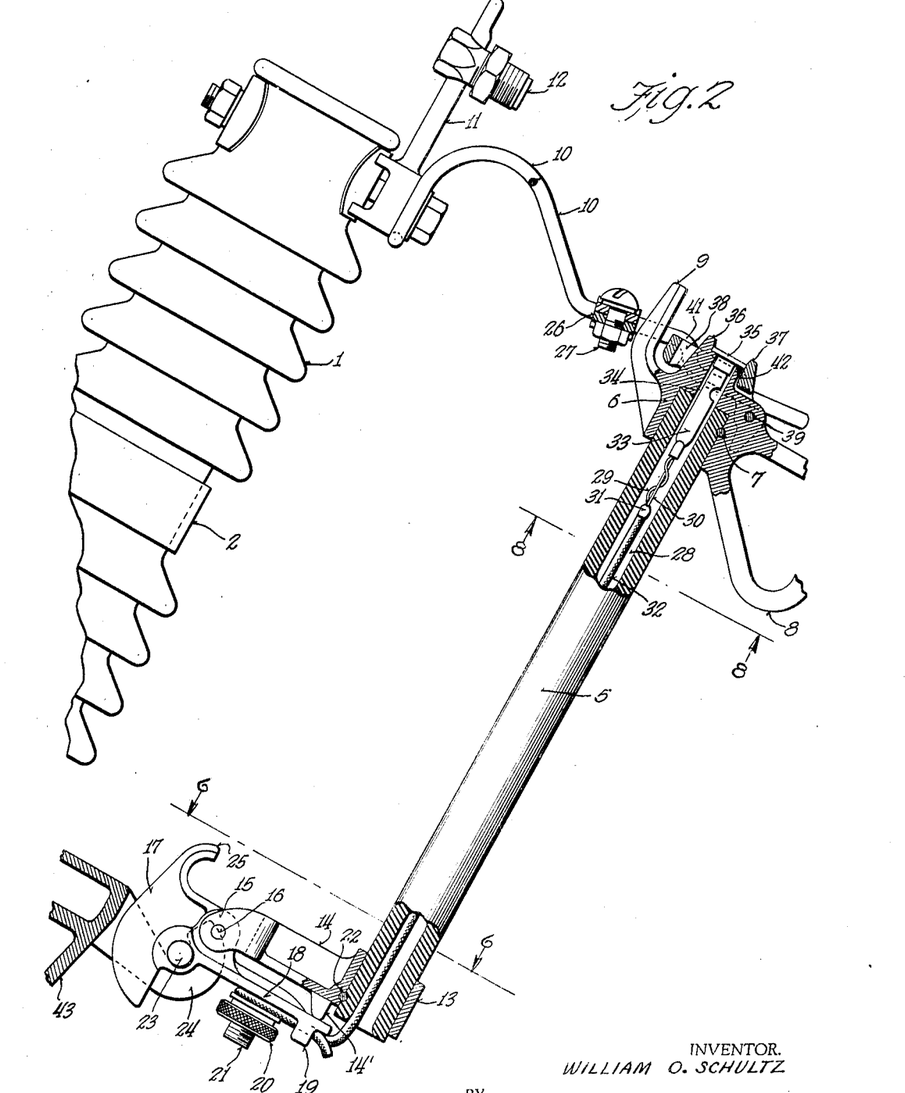
Figure 2 is an enlarged view, partly broken away and partly in section, of the structure shown in Figure 1.
Figure 3:
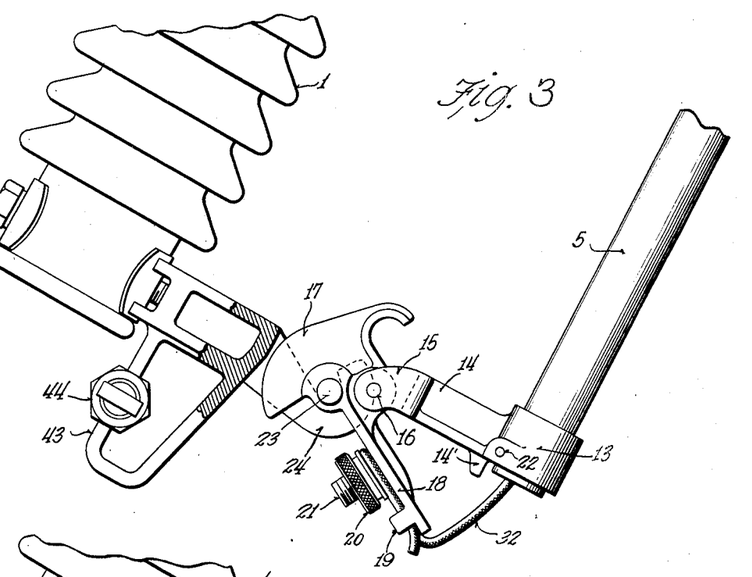
Figure 3 is a detail, partly in section, of the lower end of the fuse device showing the parts in an intermediate position after rupture of the fuse link.
Figures 7, 8, 9:
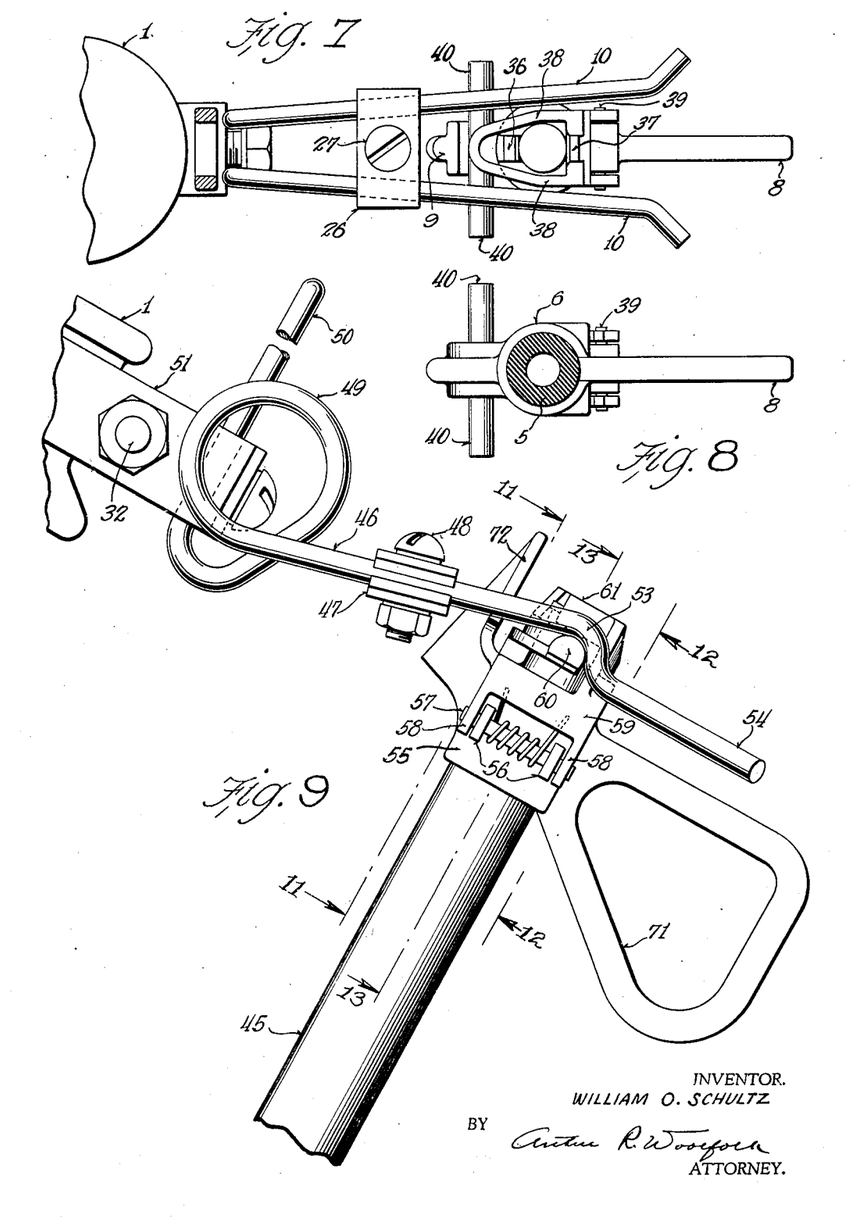
Figure 7 is a top view of the structure shown in Figure 2.
Figure 8 is a sectional view on the line 8—8 of Figure 2.
Figure 9 is a view of a further form of the invention.
Figure 10:
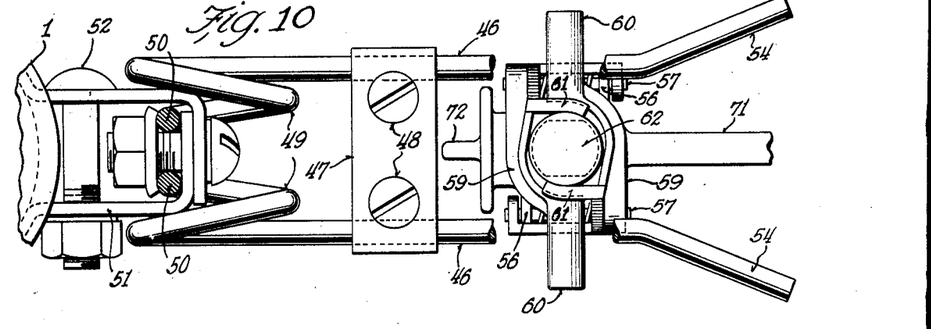
Figure 10 is a top view, partly broken away, of the structure shown in Figure 9.
Figure 11:
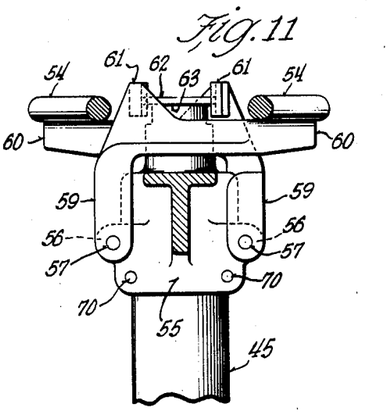
Figure 11 is a sectional view on the line 11—11 of Figure 9.

Upon reference to Figures 2 and 7, it will be seen that the resilient arms 10 of the upper stationary contact are spaced apart and are held in their relative position by the clamping members 26 which are drawn together by means of the screw 27. The finger 9, it will be seen, acts to arrest the inward rocking motion of the fuse tube when it is rocked to closed position as it will engage the clamping members 26 and thus arrest further inward motion of the fuse tube. Also the finger 9 serves to assist in guiding the tube into correct position between the arms 10, such arms being slightly outwardly flared and being provided with outwardly flared end portions, as shown in Figure 7. The upper head 6 of the fuse tube is provided, as stated, with an opening therethrough which forms a continuation of the opening through the fuse tube 5. It is adapted to receive a fuse link indicated generally at 28 in Figure 2 which may be provided with a fusible section 29 and a strain wire 30 which are secured at opposite ends by means of solder, or in any other way, as indicated at 31 to the flexible leader 32 and to the enlarged section 33 of the fuse link.

This enlarged section extends through the bore 34 of the head 6 and terminates in a button head 35. This button head seats against the flat portion 42 of the upper end of the head 6 and bears at one side against the projecting portion 36 of the head and at the other side against the projecting portion 37 of a gripping member 38. This gripping member is pivotally mounted as indicated at 39 on the head 6, see Figure 2, and is provided with outwardly projecting arms 40, see Figure 7, which are positioned beneath the spring arms 10 and which are adapted to hook beneath the downwardly turned hook like portions 41 of such spring arms to thereby temporarily latch the fuse tube in operative position.

It is to be noted that the resilient downward pressure of the arms 10 of the upper stationary contact is translated into a gripping force which causes the button head 35 of the fuse link to be gripped between the members 36 and 37.

The lower stationary contact provided with the hooks 24 may be provided with a downwardly projecting portion 43 which carries the connector 44 by means of which the load wire may be attached.

The operation of the apparatus is as follows: When an overload occurs, the fuse link is ruptured and the fuse tube is free to vent the generated gases from both ends thereof. Frictional grip on the button head 35 is such that it permits the button head to be blown directly away from the upper open end of the fuse tube, upon heavy overloads, without damage to the gripping means and without damage or contact with the upper stationary contact. There is thus an immediate relief of pressure within the fuse tube and thus very heavy overloads can be safely handled by the device without danger of bursting the tube. On light overloads the button head is intended to stay in place to give the effect of a tube open at one end only, thereby assisting in speedy clearing of the circuit inside of the tube.

After the fuse link is ruptured, the lever 18 is released and it will be noted that the pivot pin 16 is located above and outwardly of the trunnions 23. Therefore, the fuse tube is biased towards downward and outward rocking motion. The lever 18 lowers the fuse tube and detaches the arms 40, see Figure 7, from the upper stationary contact arms 10 and allows the tube to drop downwardly and rock outwardly into the final position shown in Figure 4.

The fuse tube is removed for refusing by engaging the portion 25 with a switch stick and lifting the fuse tube from the lower stationary contact. A new fuse link is placed in position and clamped by means of the thumb nut 20 with the button head positioned between the members 36 and 37. The fuse tube is again lifted into engagement with the lower stationary contact and the switch stick is then engaged with the eye 8 and the fuse tube rocked to the position shown in Figure 2, the arms 40 riding beneath the arms 10 of the upper stationary contact.

It is to be noted that the downward pressure of the spring arms 10 is transmitted to the arm 38 of the gripping member and causes the portion 37 to grip the button head 35 of the fuse link between such portion and the projecting portion 36 of the head 6 of the fuse tube.

It will be seen that a good electrical contact is obtained with the upper button head of the fuse link without, however, preventing the button head from being blown off under heavy overload conditions. Also it will be seen that the button head closes the upper end of the fuse tube and prevents entrance of rain, sleet or snow.

It will be seen further that no removable cap is required for this type of device and that there is nothing that can become detached and lost during refusing of the device.

In the succeeding forms of the invention hereinafter described the upper end only of the device has been shown but it is to be understood that the lower end of the device is constructed in the same manner as that shown for the first form of the invention.

In the form of the invention illustrated in Figures 9 through 13 the fuse tube is indicated by the reference character 45 and the insulator by the reference character 1, as this insulator and the support therefor is the same as that disclosed for the first form of the invention.

The upper stationary contact comprises a pair of spring arms 46 which are clamped by means of clamping members 47 drawn together by means of bolts 48. These spring arms each have a looped or rounded portion as indicated at 49 and are joined by means of an upwardly looped portion 50 to which the line wire may be attached. The upwardly looped portion 50 is clamped, as shown most clearly in Figure 10, to the straps 51 of the upper contact, which straps are clamped to the insulator by means of the bolt 52. The spring arms 46 of the upper stationary contact are provided with downwardly turned portions 53 and with outwardly flaring end portions 54.

The fuse tube 45 carries an upper head 55 which is provided with lugs 56 on opposite sides thereof. These lugs receive pivot pins 57. The pivot pins 57 pivotally receive the ears 58 of clamping members 59. These clamping members extend across the tube and are provided at their outer ends with projecting portions 60 which are normally hooked beneath the downwardly curved portions 53 of the resilient arms 46 of the upper contact, the downward pressure of the resilient arms 46 of the upper stationary contact being transmitted to the members 60 of the clamping members 59 and urging such members downwardly.

Each of the clamping members 59 is provided with clamping portions 61 which engage opposite sides of the button head 62 of the fuse link. The button head 62 seats upon the flat upper end 63 of the head 55 of the fuse tube, as shown most clearly in Figure 13. This fuse link may have the fusible section 64 and the strain wire 65 which are joined at opposite ends as indicated at 66 to the enlarged portion 67 and the flexible leader 68 of the fuse link. It is to be understood that any other suitable type of headed fuse link can be used in any of the different forms of the invention.

The clamping members 59 are urged outwardly by means of the springs 69 which are loosely coiled about the pins 57 and bias the clamping portions 61 towards releasing motion. However, these springs are relatively light as compared with the resilient arms 46 of the upper contacts and the pressure from the upper contacts overpowers the action of the springs 59 and thus causes the clamping portions 61 to clamp the button head 62 of the fuse link on opposite sides thereof. It is apparent from an examination of Figures 10 and 13 that upon rupture of the fuse link under heavy overloads, the head 62 can blow directly outwardly without damage to the gripping members and without contacting the arms 46 of the stationary contact and thus the fuse tube is vented at both ends. It is also apparent that when the fuse tube is removed for refusing, the gripping members 61 are moved apart by means of their springs 69 and are forced back into gripping engagement with the button head 62 of the fuse link when the fuse tube is rocked to operative position. If desired the springs 69 could be omitted.

Figure 12:
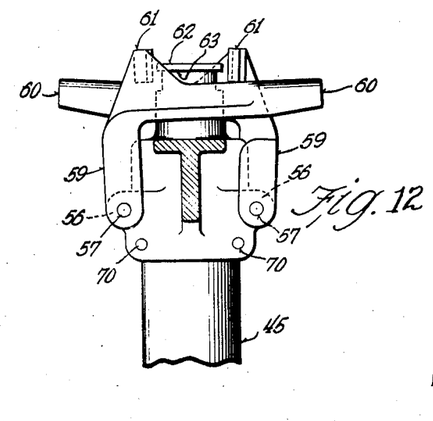
Figure 12 is a sectional view on the line 12—12 of Figure 9, such view, however, showing the position of the parts when the fuse tube is removed from the stationary contacts.
Figure 13:
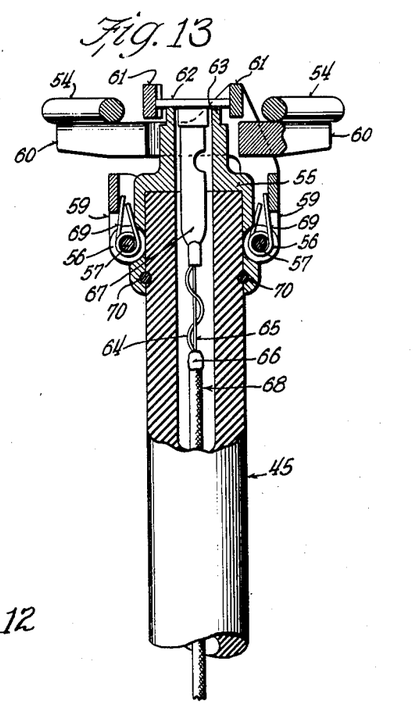
Figure 13 is a sectional view on the line 13—13 of Figure 9.
Figure 14:
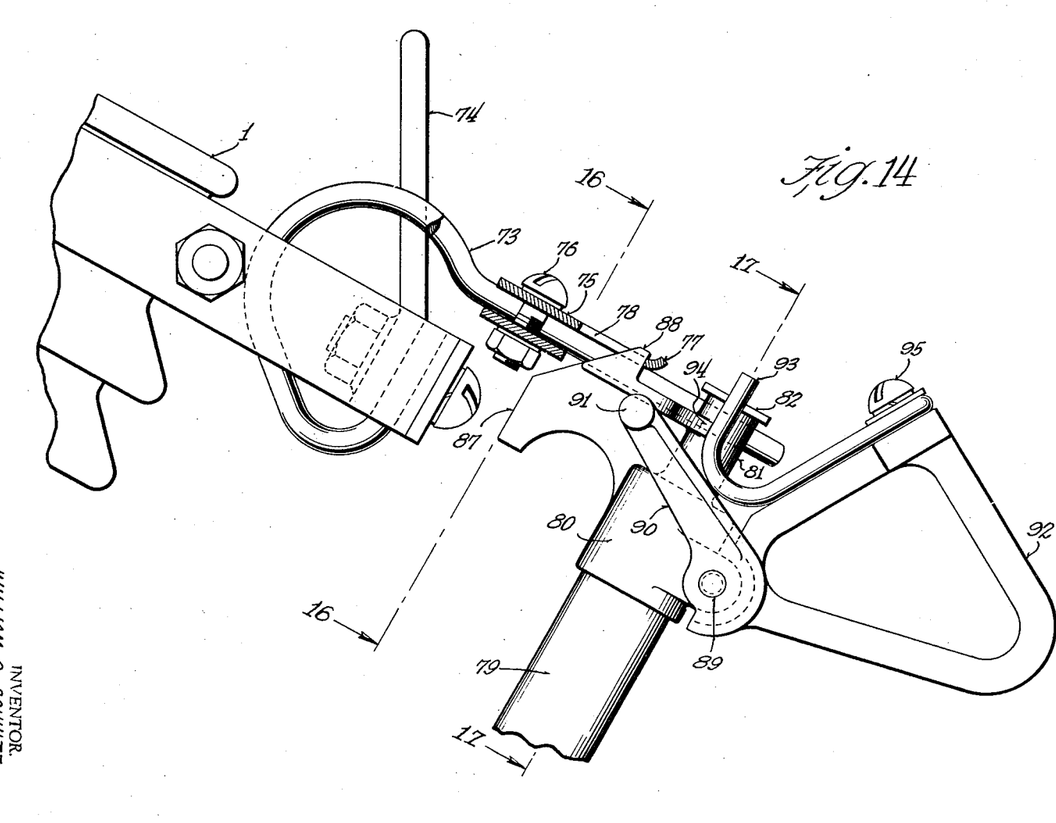
Figure 14 is a view, partly in section, showing another form of the invention.
Figure 15:
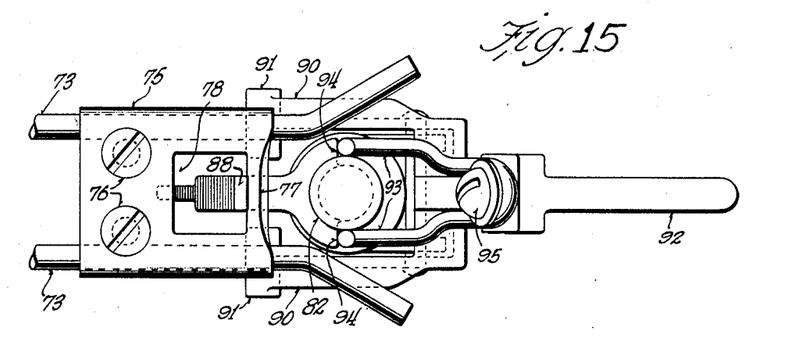
Figure 15 is a top view, partly broken away, of the structure shown in Figure 14.
Figure 16:
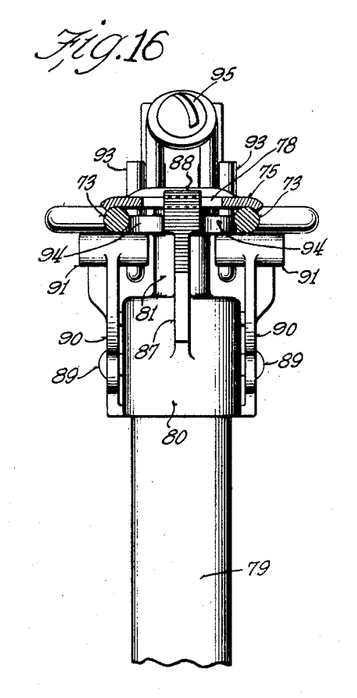
Figure 16 is a sectional view on the line 16—16 of Figure 14.

The upper head 55 of the fuse tube may be secured rigidly to the fuse tube in any suitable manner, as by means of the pins 70. This head is provided with a manipulating eye 71 and with an upwardly projecting tongue 72 which, in the event the fuse tube should tend to swing laterally in either direction during closing motion, will act to guide the fuse tube into position between the flaring resilient arms of the upper contact. The tongue 72 also acts as a stop so as to limit the inward rocking motion of the fuse tube as it will engage the clamping members 47 of the upper contact in the event an attempt is made to swing the fuse tube too far inwardly. In Figure 12 the position of the parts is that which they take during re-fusing when the fuse tube is removed from the stationary contacts. It will be seen that the gripping members 61 have been moved apart and outward rocking motion of such members is limited because the projecting members 60 engage beneath the members 61 as indicated in Figure 12 and thus limit the extent to which the members 61 can open outwardly.

In the form of the invention shown in Figures 14 to 17 the main insulator is indicated at 1 and the upper stationary contact is indicated as provided with a pair of spaced resilient arms 73 which are provided with an upwardly extending looped portion 74 adapted to receive the line wire. These arms are held against spreading by means of clamping members 75 drawn towards each other by means of the bolts 76. The upper clamping member 75 is provided with a catch portion 77 and with a slotted portion 78 behind the catch portion.

Figure 17:
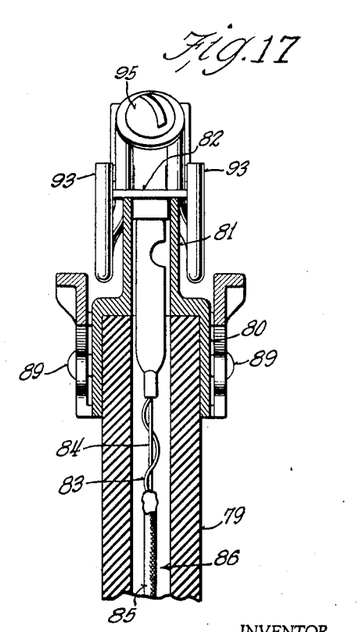
Figure 17 is a sectional view on the line 17—17 of Figure 14.

The fuse tube 79 is provided with a head 80 which has an upwardly projecting tubular extension 81 integral therewith and terminating in a flat upper surface upon which the button head 82 of the fuse link rests. The fuse link is provided with a fusible section 83 and with a strain wire 84 and a flexible leader 85. In each of the several forms of the invention the fuse link extends from the button head through the bore 86 of the fuse tube outwardly through the open lower end. It is to be noted that the bore of the tubular member 81 forms a continuation of the bore 86 of the fuse tube, as shown in Figure 17.

The head 80 is provided with an extension or web 87 which will act as a stop and engage a portion of the stationary contact to limit inward rocking motion of the fuse tube when it is rocked to closed position. The head is also provided with a latch member 88 which hooks behind the catch member 77 when the fuse tube is rocked to closed position.

At latch releasing member is pivotally carried by the head 80 and is pivoted as indicated at 89 thereto. It is provided with a pair of arms 90 which straddle the head of the fuse tube and terminate in laterally projecting portions 91 which are located beneath and receive the downward pressure of the resilient arms 73 of the upper stationary contact. This pivoted latch member also has integrally formed therewith the manipulating eyelet 92 so that the eyelet may be pulled down by means of a switch stick and may thus raise the arm 73 and unlatch the fuse tube, allowing it to be manually rocked to open position.

The pivoted latch releasing member carries a pair of spring arms 93 which grip opposite sides of the button head 82 of the fuse link when the latch member is rocked to the position shown in the drawings. It is held in this position by means of the downward pressure of the spring arms 73 of the upper stationary contact. The rocking motion of the latch member through the medium of the resilient arms 73 of the upper stationary contact is limited by the engagement of the arms 93 against the shouldered portions 94 which are integral with the head 80 of the fuse tube. The spring arms 93 are provided with a looped portion which is secured to the manipulating eyelet 92 by means of the screw 95.

It is apparent that when the fuse tube is rocked into operative position, the spring arms 93 are held in their engaging position by means of the downward pressure of the resilient arms 73 of the upper stationary contact. They are slightly expanded and grip the button head 82 of the fuse link.

When the fuse link is ruptured under heavy overloads and there is sudden evolution of gas, the fuse tube is vented from both ends thereof and the button head 82 blows directly outwardly without damage to the gripping members and without contacting the upper stationary contact.

Figures 18, 19, 20:
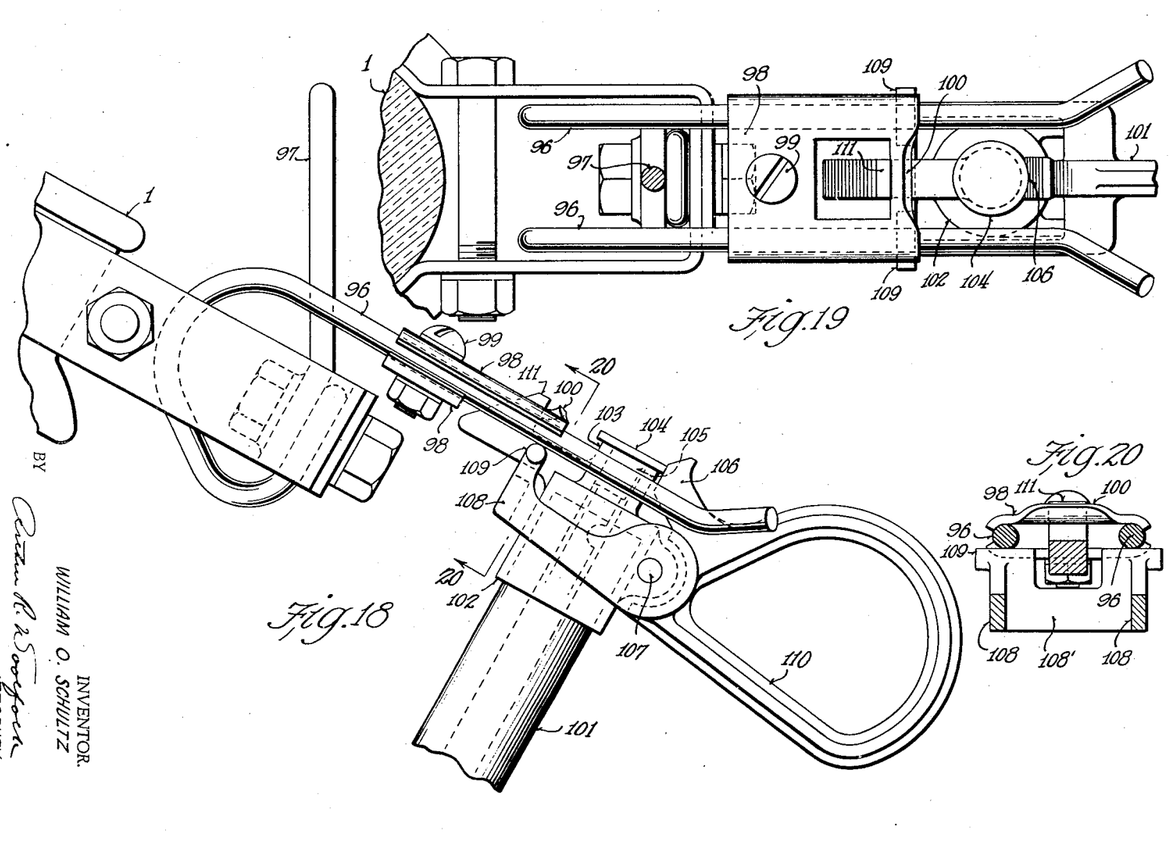
Figure 18 is a view showing a further form of the invention.
Figure 19 is a top view, partly broken away, of the structure shown in Figure 18.
Figure 20 is a sectional view on the line 20—20 of Figure 18.

In the form of the invention shown in Figures 18 through 20 the supporting insulator is indicated at 1 and supports the spaced resilient arms 96 of the upper stationary contact, such arms being provided with an intermediate, upwardly extending looped portion 97 to which the line wire may be attached. The outer ends of the spring arms 96 flare outwardly and upwardly, as shown in Figures 18 and 19. The arms are held against spreading by means of the clamping members 98, such members being drawn towards each other by means of the bolt 99. The upper clamping member is provided with an upturned catch portion 100. The fuse tube is indicated at 101 and is provided with a head portion 102 which is apertured as indicated to form a continuation of the bore in the fuse tube and terminates in an upwardly projecting cylindrical extension 103 against which the button head 104 of the fuse link is adapted to rest. It is to be noted that the shank portion 105 of the fuse link loosely fits within the bore of the head 102. It is urged into gripping or binding engagement with the inner surface thereof by means of the foot portion 106 of a pivoted latch releasing member. This pivoted latch releasing member is pivoted to the head by means of the pin 107 and is provided with a pair of spaced arms 108 which are provided with laterally projecting portions 109 which are located beneath and receive the downward pressure of the spring arms 96 of the upper stationary contact. These arms 108 may be joined by a transverse web 108', as shown in Figure 20. This latch member also has integrally formed therewith the manipulating eyelet member 110 and the gripping foot 106. The head 102 has a latch member 111 integral therewith and projecting inwardly and adapted to latch behind the catch 100.

It is preferable, as most clearly shown in Figure 19, to provide the foot 106 with a curved portion so that it will engage a substantial portion of the curved button head 104.

It is clear that the downward pressure of the spring arms 96 causes the foot 106 to grip the button head of the fuse link and to cause the shank 105 of the fuse link to bind against the inner surface of the bore of the tubular extension 103 of the head 102, and thus the fuse link is gripped due to the resilient downward pressure of the upper contact arms 96. When the fuse link is ruptured under heavy overloads, the head 104 of the fuse link is blown directly outwardly without damage to the gripping portion and without engaging the stationary contacts.

Figures 21, 22, 23:
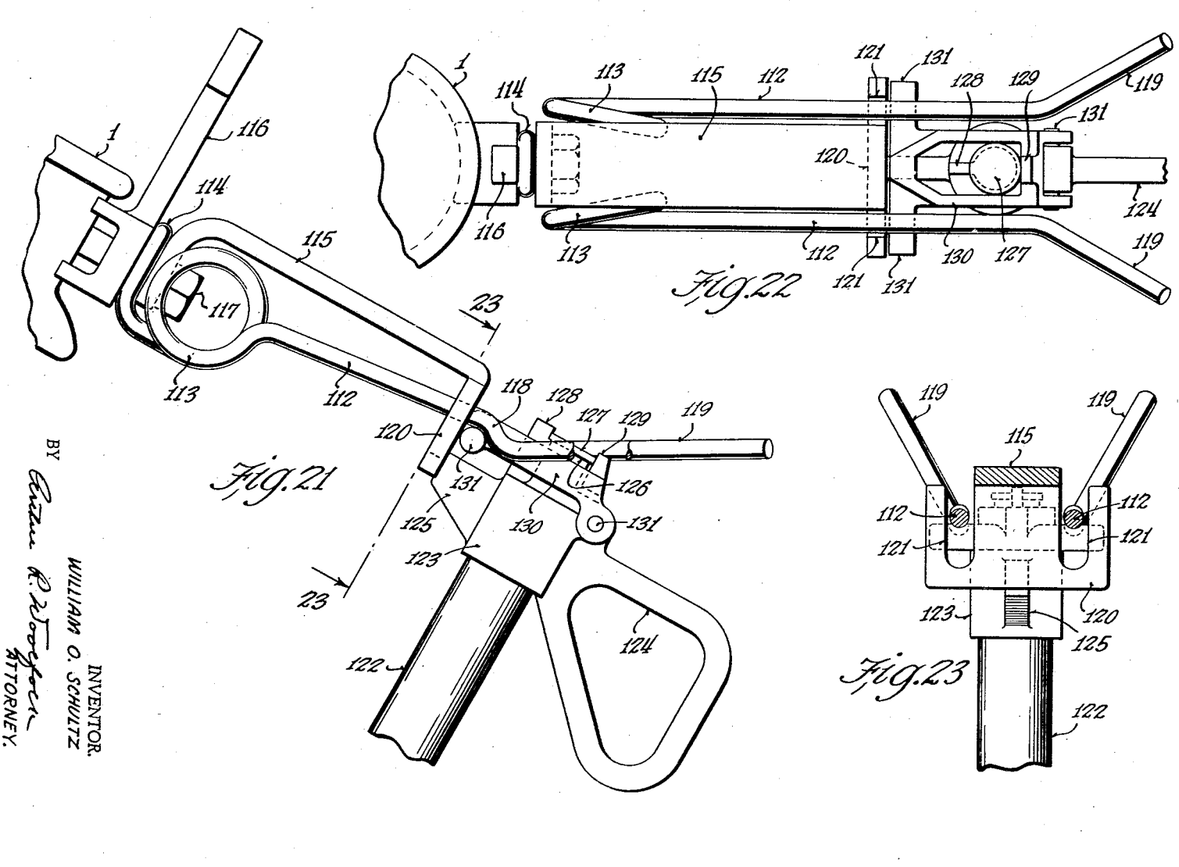
Figure 21 is a view showing a further form of the invention.
Figure 22 is a top view of the structure shown in Figure 21.
Figure 23 is a sectional view on the line 23—23 of Figure 21.

In the form of the invention shown in Figures 21 through 23 the supporting insulator is indicated at 1 and carries the upper contact which consists of the outwardly extending resilient arms 112 each of which is provided with a rounded portion 113. These arms are joined by a looped portion 114. The upper stationary contact is also provided with a rigid plate 115 and with a terminal portion 116 adapted to receive the line wire. These portions are all clamped together by means of the bolt 117.

The resilient arms 112 are provided with downwardly extending portions 118 and with upwardly and outwardly flaring outer end portions 119.

The rigid plate 115 has an outer end portion 120 which is provided with upwardly opening slots 121 which loosely receive the spring arms 112 and thus guide and prevent spreading of such spring arms, as shown most clearly in Figures 22 and 23. The fuse tube 122 is provided with a head 123 which has integrally formed therewith the manipulating eyelet 124 and the stop portion 125 adapted to engage the member 120 of the rigid plate 115. The head 123 is provided with a flat upper surface 126 upon which the button head 127 of the fuse link rests. It is also provided with a projecting portion 128 on the inner side of the button head. The other side of the button head is engaged by the gripping portion 129 of the gripping member 130 which is pivoted as indicated at 131 to the head 123. The gripping member 130 extends inwardly and is provided with laterally projecting portions 131 which fit behind the downwardly extending portions 118 of the resilient arms 112 of the upper stationary contact and receive the downward pressure of such resilient arms. This downward pressure is translated into a gripping force causing the gripping member 129 to grip the button head 127 between itself and the projection 128, as shown most clearly in Figure 21. It is clear that when a heavy overload occurs, the button head will be blown directly outwardly from the gripping members without damage to the gripping members and without engaging the stationary upper contact.

It will be seen that in all forms of the invention a drop-out fuse construction has been provided in which a headed fuse link is employed and in which a fuse tube open at both ends is used. The button head is utilized to normally close the upper end of the fuse tube and prevent entrance of rain, snow or sleet into the fuse tube. It is held firmly gripped so as to secure good electrical contact and is adapted and designed to blow directly outwardly under heavy overloads without damage to the gripping means and without contacting the upper stationary contact. This allows venting of the fuse tube at both ends thereof and thereby enables the device to handle excessively large overloads without damage. In all forms of the invention it is intended that the head of the fuse link remain in place under light overloads so as to give the effect of a tube open at one end only, thereby assisting in speedy clearing of the circuit inside of the tube.

It is to be noted also that after the fuse link has been ruptured, in all forms of the invention the fuse tube drops out of circuit.

It will be seen further that the invention provides expulsion fuse tube devices which may be easily refused, which may be manually opened or closed, which may be freely removed for refusing, and which provides for the discharge of the head of the fuse link without damage to any part of the apparatus, and, as stated, provides for the free venting of the generated gases from both ends of the fuse tube.

Although this invention has been described in considerable detail, it is to be understood that such description is intended as illustrative rather than limiting, as the invention may be variously embodied and is to be interpreted as claimed.

I claim:

1. A fuse device comprising a pair of spaced stationary contacts, one of said stationary contacts being yieldingly urged towards the other stationary contact, a fuse tube open at each end, a fuse link having a head at one end normally closing one end of said fuse tube and extending through said fuse tube and electrically connecting said stationary contacts, and gripping means gripping the head of said fuse link, said gripping means being held in gripping position by the yieldingly urged stationary contact.

2. A fuse device comprising a pair of spaced stationary contacts, one of said stationary contacts being yieldingly urged for motion with reference to the other stationary contact, a fuse tube open at both ends, a fuse link having a head normally closing one end of said fuse tube and extending through said fuse tube and electrically connecting said stationary contacts, and gripping means for gripping the head of said fuse link, the yieldingly urged stationary contact cooperating with the gripping means and producing the gripping action of said gripping means.

3. A fuse device comprising a pair of spaced stationary contacts, one of said stationary contacts being yieldingly urged towards the other stationary contact, a fuse tube open at each end, a fuse link having a head at one end normally closing one end of said fuse tube and extending through said fuse tube and electrically connecting said stationary contacts, and gripping means gripping the head of said fuse link, said gripping means being held in gripping position by the yieldingly urged stationary contact, said gripping means being carried by said fuse tube.

4. A fuse device comprising a pair of spaced stationary contacts, one of said stationary contacts being yieldingly urged for motion with reference to the other stationary contact, a fuse tube open at both ends, a fuse link having a head normally closing one end of said fuse tube and extending through said fuse tube and electrically connecting said stationary contacts, and gripping means for gripping the head of said fuse link, the yieldingly urged stationary contact cooperating with the gripping means and producing the gripping action of said gripping means, said gripping means being movably carried by said fuse tube.

5. A fuse device comprising a pair of spaced stationary contacts, one of said stationary contacts being yieldingly urged for motion with reference to the other stationary contact, a fuse tube open at both ends, a fuse link having a head normally closing one end of said fuse tube and extending through said fuse tube and electrically connecting said stationary contacts, and grippings means for gripping the head of said fuse link, the yieldingly urged stationary contact cooperating with the gripping means and producing the gripping action of said gripping means, said gripping means being pivotally mounted on said fuse tube.

6. A fuse device comprising a pair of spaced stationary contacts, a fuse tube open at both ends and having a projecting portion adjacent one end, a fuse link having a headed end normally closing the end of the fuse tube provided with the projecting portion and extending from the headed end through the fuse tube and electrically connecting said stationary contacts, and gripping means carried by said fuse tube and gripping the head of said fuse link between the projecting portion and said gripping means.

7. A fuse device comprising a pair of spaced stationary contacts, a fuse tube open at both ends and having a projecting portion adjacent one end, a fuse link having a headed end normally closing the end of the fuse tube provided with the projecting portion and extending from the headed end through the fuse tube and electrically connecting said stationary contacts, and gripping means carried by said fuse tube and gripping the head of said fuse link between the projecting portion and said gripping means, one of said stationary contacts being resiliently urged for motion with reference to the other stationary contact and urging said gripping means towards gripping position.

8. A fuse device comprising a pair of spaced stationary contacts, one of said stationary contacts consisting of a pair of spaced arms resiliently urged for motion with reference to the other stationary contact, a fuse tube open at both ends, a fuse link having a head normally closing one end of said fuse tube and extending through the fuse tube and electrically connecting the stationary contacts, gripping means pivotally mounted on said fuse tube for gripping the head of said fuse link, the head of said fuse link being located between and out of contact with the said spaced arms of the resiliently urged stationary contact, said gripping means having a transverse portion engaging said spaced arms and urging said gripping means towards gripping position through the force exerted by said spaced arms.

9. A fuse device comprising a pair of spaced stationary contacts, a fuse tube open at both ends, a fuse link having a head normally closing one end of said fuse tube and extending through the fuse tube and electrically connecting the stationary contacts, and a pair of gripping means pivotally carried by said fuse tube and laterally gripping the head of said fuse link from opposite sides thereof.

10. A fuse device comprising a pair of spaced stationary contacts, a fuse tube open at both ends, a fuse link having a head normally closing one end of said fuse tube and extending through the fuse tube and electrically connecting the stationary contacts, and a pair of gripping means pivotally carried by said fuse tube and laterally gripping the head of said fuse link from opposite sides thereof, one of said stationary contacts being resiliently urged for motion with reference to the other stationary contact, said pair of gripping means each having portions directly engaging the resiliently urged stationary contact and translating the force of said resiliently urged stationary contact into a gripping force for gripping the head of said fuse link.

11. A fuse device comprising a pair of spaced stationary contacts, one of said stationary contacts having a pair of spaced arms resiliently urged for motion with reference to the other stationary contact, a fuse tube open at both ends, a fuse link having a head normally closing one end of said fuse tube and extending through the fuse tube and electrically connecting said stationary contacts, a pair of pivoted gripping means yieldingly urged towards releasing motion and located on opposite sides of said fuse tube and adapted to grip the head of said fuse link, and means carried by each of said gripping means and engaged by said resiliently urged arms of said one stationary contact and translating the force of said resiliently urged arms of said one stationary contact into a gripping force, whereby said gripping means will grip the head of said fuse link.

12. A fuse device comprising a pair of spaced stationary contacts, one of said stationary contacts being resiliently urged for motion with reference to the other stationary contact, catch means carried by said resiliently urged stationary contact, a fuse tube open at both ends, a fuse link having a head normally closing one end of said fuse tube and extending through the fuse tube and electrically connecting said spaced stationary contacts, said fuse tube having a latch normally engaging the catch of the resiliently urged stationary contact, releasing means pivotally mounted on said fuse tube for moving the resiliently urged stationary contact to releasing position, and means carried by said releasing means and laterally engaging opposite sides of the head of said fuse link.

13. A fuse device comprising a pair of spaced stationary contacts, one of said stationary contacts being resiliently urged for motion with reference to the other stationary contact, catch means carried by said resiliently urged stationary contact, a fuse tube open at both ends, a fuse link having a head normally closing one end of said fuse tube and extending through the fuse tube and electrically connecting said spaced stationary contacts, said fuse tube having a latch normally engaging the catch of the resiliently urged stationary contact, releasing means pivotally mounted on said fuse tube for moving the resiliently urged stationary contact to releasing position, and resilient means carried by said releasing means and laterally engaging opposite sides of the head of said fuse link.

14. A fuse device comprising a pair of spaced stationary contacts, one of said contacts being resiliently urged for motion with reference to the other stationary contact, a fuse tube open at both ends and having a head at one end provided with an opening therethrough, a fuse link having a head normally closing the opening in the head of said fuse tube and having a shank extending into the opening of the head of said fuse tube, said fuse link extending through said fuse tube and electrically connecting said stationary contacts, the head of said fuse tube having latch means detachably latching with said resiliently urged stationary contact, pivoted releasing means carried by the head of said fuse tube for moving said resiliently urged stationary contact to releasing position, said pivoted releasing means having a foot portion engaging the head of said fuse link and urging the shank of said fuse link into engagement with the adjacent portion of the head of said fuse tube, said pivoted releasing means being urged to engage the head of the fuse link through the medium of the resiliently urged stationary contact.

15. A fuse device comprising a pair of spaced stationary contacts, one of said stationary contacts consisting of a rigid plate provided with slots and a pair of resilient arms located within said slots, a fuse tube open at both ends and having a projection adjacent one end, a fuse link having a head normally closing the end of said fuse tube provided with the projecting portion and extending through the fuse tube and electrically connecting said stationary contacts, and gripping means pivotally carried by said fuse tube and having projecting portions engaging the said resilient arms and gripping the head of said fuse link between itself and the projecting portion of said fuse tube, the gripping action being caused by the force exerted by the said resilient arms.

16. A fuse device comprising a pair of spaced stationary contacts, one of said stationary contacts consisting of a rigid plate provided with slots and a pair of resilient arms located within said slots, a fuse tube open at both ends and having a projection adjacent one end, a fuse link having a head normally closing the end of said fuse tube provided with the projecting portion and extending through the fuse tube and electrically connecting said stationary contacts, and gripping means pivotally carried by said fuse tube and having projecting portions engaging the said resilient arms and gripping the head of said fuse link between itself and the projecting portion of said fuse tube, the gripping action being caused by the force exerted by the said resilient arms, said fuse tube having a projecting portion adapted to engage said rigid plate.

17. A drop-out fuse device comprising a pair of spaced stationary contacts, one of said stationary contacts being yieldingly urged towards the other stationary contact, a fuse tube open at each end, a fuse link having a head at one end normally closing one end of said fuse tube and extending through said fuse tube and electrically connecting said stationary contacts, gripping means gripping the head of said fuse link, said gripping means being held in gripping position by the yieldingly urged stationary contact, and means controlled by said fuse link for releasably holding said fuse tube in operative position.

18. A drop-out fuse device comprising a pair of spaced stationary contacts, one of said stationary contacts being yieldingly urged for motion with reference to the other stationary contact, a fuse tube open at both ends, a fuse link having a head normally closing one end of said fuse tube and extending through said fuse tube and electrically connecting said stationary contacts, gripping means for gripping the head of said fuse link, the yieldingly urged stationary contact cooperating with the gripping means and producing the gripping action of said gripping means, said gripping means being movably carried by said fuse tube, and means controlled by said fuse link for releasably holding said fuse tube in operative position.

WILLIAM O. SCHULTZ.